US012526284B2

(12) United States Patent
Neystadt et al.

(10) Patent No.: US 12,526,284 B2
(45) Date of Patent: Jan. 13, 2026

(54) METHOD AND SYSTEM FOR AUTOMATED PERMISSIONS MANAGEMENT

(71) Applicant: VARONIS SYSTEMS, INC., New York, NY (US)

(72) Inventors: John (Eugene) Neystadt, Kfar-Saba (IL); Lior Chen, Tel Mond (IL)

(73) Assignee: VARONIS SYSTEMS, INC., New York, NY (US)

( * ) Notice: Subject to any disclaimer, the term of this patent is extended or adjusted under 35 U.S.C. 154(b) by 233 days.

(21) Appl. No.: 18/333,276

(22) Filed: Jun. 12, 2023

(65) Prior Publication Data

US 2024/0414167 A1 Dec. 12, 2024

(51) Int. Cl.
*H04L 9/40* (2022.01)

(52) U.S. Cl.
CPC ........ *H04L 63/104* (2013.01); *H04L 63/1433* (2013.01)

(58) Field of Classification Search
CPC .......................... H04L 63/104; H04L 63/1433
See application file for complete search history.

(56) References Cited

U.S. PATENT DOCUMENTS

| 8,166,026 | B1 | 4/2012 | Sadler |
| 8,230,480 | B2* | 7/2012 | Fazal ..................... H04L 63/101 |
| | | | 709/225 |
| 8,954,716 | B2* | 2/2015 | Singleton ................ H04L 63/20 |
| | | | 713/1 |
| 9,614,851 | B1* | 4/2017 | Vevle ..................... H04L 63/104 |
| 9,692,748 | B2* | 6/2017 | Maheshwari ........... H04L 63/08 |
| 10,868,832 | B2* | 12/2020 | Li ........................ H04L 63/1416 |
| 10,938,832 | B2* | 3/2021 | Miller ................... H04L 63/105 |
| 11,310,282 | B1 | 4/2022 | Zhang et al. |
| 11,546,341 | B2* | 1/2023 | Fuhry ................... G06F 21/602 |
| 11,671,503 | B2 | 6/2023 | Zhao et al. |
| 12,143,444 | B1* | 11/2024 | Mendell .............. H04L 67/1095 |

(Continued)

OTHER PUBLICATIONS

Park, Jaehong, Ravi Sandhu, and Yuan Cheng. "A user-activity-centric framework for access control in online social networks." IEEE Internet Computing 15.5 (2011): 62-65.*

(Continued)

*Primary Examiner* — Jimmy H Tran
(74) *Attorney, Agent, or Firm* — Sughrue Mion, PLLC

(57) ABSTRACT

A system and method for dynamically refining access rules for governing control of access by multiple users to data elements or services (DEOSs) stored in or accessed through at least one access controllable network element (ACONE), including collecting initial permissions to the DEOSs, receiving and periodically updating notifications of actual access events of the multiple users to the DEOSs, generating initial user groups for the multiple users, generating for each of the initial user groups, based at least partially on the notifications of actual access events, a list of users who have accessed at least one of the DEOSs, based at least partially on the lists, generating modified user groups, based at least partially on the modified user groups, generating modified permissions, and based on the modified permissions, updating the initial permissions to the DEOSs, thereby enabling only the users in particular modified user groups to access particular DEOSs.

20 Claims, 10 Drawing Sheets

(56) References Cited

U.S. PATENT DOCUMENTS

| | | | | |
|---|---|---|---|---|
| 2002/0178271 | A1* | 11/2002 | Graham | H04L 69/329 709/229 |
| 2003/0115484 | A1* | 6/2003 | Moriconi | H04L 63/20 726/1 |
| 2007/0156694 | A1* | 7/2007 | Lim | G06F 16/176 707/999.009 |
| 2008/0013488 | A1* | 1/2008 | Garg | H04W 60/04 370/331 |
| 2009/0049196 | A1* | 2/2009 | Smith | H04L 63/104 709/245 |
| 2009/0083861 | A1* | 3/2009 | Jones | H04L 63/0892 726/29 |
| 2009/0288134 | A1* | 11/2009 | Foottit | G06F 21/105 726/1 |
| 2011/0010758 | A1* | 1/2011 | Faitelson | H04L 9/32 726/4 |
| 2012/0021741 | A1* | 1/2012 | Pancorbo Marcos | H04M 15/80 455/433 |
| 2013/0024454 | A1* | 1/2013 | Dunn | G06F 16/907 707/E17.046 |
| 2013/0067597 | A1* | 3/2013 | Choi | H04L 63/104 726/28 |
| 2013/0304765 | A1* | 11/2013 | Failelson | G06F 21/6236 707/785 |
| 2014/0032758 | A1* | 1/2014 | Barton | G06F 21/6218 709/225 |
| 2015/0019273 | A1* | 1/2015 | Grosz | G06Q 10/02 705/5 |
| 2015/0249717 | A1* | 9/2015 | Mencke | G06F 16/51 709/204 |
| 2015/0281277 | A1* | 10/2015 | May | H04L 63/10 726/1 |
| 2016/0119379 | A1* | 4/2016 | Nadkarni | H04L 63/0263 726/1 |
| 2017/0295140 | A1* | 10/2017 | Glazemakers | H04L 63/101 |
| 2017/0295181 | A1* | 10/2017 | Parimi | H04L 67/10 |
| 2017/0295197 | A1* | 10/2017 | Parimi | H04L 67/10 |
| 2017/0331692 | A1* | 11/2017 | Hague | H04L 41/0894 |
| 2019/0327271 | A1* | 10/2019 | Saxena | H04L 41/16 |
| 2020/0028854 | A1* | 1/2020 | Fabrizi | G06F 16/2471 |
| 2020/0092300 | A1* | 3/2020 | Mital | H04L 69/329 |
| 2020/0097195 | A1* | 3/2020 | Fritz | G06F 3/0647 |
| 2020/0242708 | A1* | 7/2020 | Schneider | G06Q 50/01 |
| 2020/0396222 | A1* | 12/2020 | Gargaro | H04L 63/20 |
| 2021/0006563 | A1* | 1/2021 | Rubinstein | G06Q 10/1091 |
| 2021/0194881 | A1* | 6/2021 | Finnerty | G06F 21/604 |
| 2021/0258321 | A1* | 8/2021 | Vegulla | G06N 5/04 |
| 2021/0314353 | A1* | 10/2021 | Melson | H04L 67/02 |
| 2022/0019681 | A1* | 1/2022 | Yarabolu | G06F 21/6245 |
| 2022/0261445 | A1* | 8/2022 | Gentilcore | G06F 16/9035 |
| 2022/0303313 | A1* | 9/2022 | Gargaro | H04L 63/1425 |
| 2023/0028594 | A1* | 1/2023 | Thummisi | H04L 63/104 |
| 2023/0059019 | A1* | 2/2023 | Asthana | H04L 65/4015 |
| 2023/0156011 | A1* | 5/2023 | Palmer | H04L 63/101 726/4 |
| 2023/0409819 | A1* | 12/2023 | Werr | G06F 40/186 |
| 2024/0015016 | A1* | 1/2024 | Sidman | H04L 9/32 |
| 2024/0195840 | A1* | 6/2024 | Narayanaswamy | H04L 63/0263 |
| 2024/0249148 | A1* | 7/2024 | Pak | G06N 3/091 |
| 2024/0356982 | A1* | 10/2024 | Akali | H04L 63/104 |
| 2024/0406183 | A1* | 12/2024 | Comeras | H04L 63/104 |

OTHER PUBLICATIONS

Engelen, Lina, et al. "Is activity-based working impacting health, work performance and perceptions? A systematic review." Building research & information 47.4 (2019): 468-479.*

McNally, Michael G., and Craig R. Rindt. "The activity-based approach." Handbook of transport modelling. vol. 1. Emerald Group Publishing Limited, 2007. 55-73.*

An International Search Report and a Written Opinion both dated Aug. 21, 2024, which issued during the prosecution of Applicant's PCT/IL2024/050472.

* cited by examiner

METHOD AND SYSTEM FOR AUTOMATED PERMISSIONS MANAGEMENT

REFERENCE TO RELATED APPLICATIONS

Reference is made to the Applicant's U.S. Pat. No. 7,606,801, entitled AUTOMATIC MANAGEMENT OF STORAGE ACCESS CONTROL, which is related to the subject matter of the present application, the disclosure of which is hereby incorporated by reference.

FIELD OF THE INVENTION

The present invention relates to systems and methods for managing permissions to data elements and services generally.

BACKGROUND OF THE INVENTION

Various types of systems and methods for managing permissions to data elements and services are known in the art.

SUMMARY OF THE INVENTION

The present invention seeks to provide improved systems and methods for managing permissions to data elements and services.

There is thus provided in accordance with a preferred embodiment of the present invention a method for dynamically refining access rules for governing control of access by multiple users to a multiplicity of data elements or services (DEOSs) stored in or accessed through at least one access controllable network element (ACONE), the method being implemented on at least one computer and including collecting initial permissions to ones of the multiplicity of DEOSs, each of the multiplicity of DEOSs including DEOS material, receiving notifications of actual access events of ones of the multiple users to ones of the multiplicity of DEOSs, generating initial user groups, each of the initial user groups including one or more of the multiple users, periodically receiving updated notifications of actual access events, generating, for each of the initial user groups, based at least partially on the updated notifications of actual access events, a list of those of the multiple users who have accessed at least one of the multiplicity of DEOSs, based at least partially on the lists, generating modified user groups, each of the modified user groups including a selected subset of the multiple users, based at least partially on the modified user groups, generating modified permissions to at least one of the multiplicity of DEOSs, and based on the modified permissions, updating the initial permissions to ones of the multiplicity of DEOSs, thereby enabling, for particular DEOSs of the multiplicity of DEOSs, only users in a corresponding one of the selected subset of the multiple users to access the particular DEOSs.

Preferably, the method also includes generating an individual designator for each individual user of the multiple users, the individual designator including an organization identifier and data access profile, designating permissions of the individual user to ones of the multiplicity of DEOSs.

In accordance with a preferred embodiment of the present invention, the collecting initial permissions includes at least one of receiving permissions to the multiplicity of DEOSs from metadata associated particularly with the multiplicity of DEOSs and receiving permissions to the multiplicity of DEOSs from metadata associated particularly with the multiple users. Preferably, the metadata associated particularly with the multiple users indicates existing external user groups.

In accordance with a preferred embodiment of the present invention, the method further includes defining a plurality of DEOS groups, each of the plurality of DEOS groups including a subset of the multiplicity of DEOSs.

Preferably, the initial user groups are based on at least one of the initial permissions to the multiplicity of DEOSs, the DEOS groups, the notifications of actual access events and existing external user groups.

Preferably, the initial user groups are based on the notifications of actual access events to ones of the multiplicity of DEOSs in more than one of the ACONEs.

In accordance with a preferred embodiment of the present invention, the method also includes assigning a risk ranking score to each of the DEOS groups.

Preferably, the risk ranking score indicates a level of sensitivity of each of the DEOS groups relative to others of the DEOS groups. Preferably, the risk ranking score is at least partially based on at least one of a level of sensitivity of the DEOS material of the ones of the DEOSs in the DEOS group, a number of the individual users of the multiple users having permissions to the DEOS group and the organization identifiers of the individual users having permissions to the DEOS group.

In accordance with a preferred embodiment of the present invention, the modified permissions are further based at least partially on at least one of the initial permissions, the DEOS groups, the initial user groups and the risk ranking score.

In accordance with a preferred embodiment of the present invention, the method further includes receiving a policy that determines a duration for which permissions are retained by the users after the updated notifications of actual access events to the multiplicity of DEOSs. Preferably, the duration is at least partially based on a risk ranking score associated with the DEOSs, the risk ranking score indicating a level of sensitivity of the DEOSs relative to others of the DEOSs.

In accordance with a preferred embodiment of the present invention, the method further includes deleting the initial user groups and removing permissions associated therewith, after generating the modified user groups.

Preferably, the method further includes updating the existing external user groups based on the modified user groups.

In accordance with a preferred embodiment of the present invention, the at least one ACONE includes at least one of a firewall, an Internet proxy, a Domain Name System gateway, an email server, a database, a file server and a productivity application.

In accordance with a preferred embodiment of the present invention, the method further includes assigning a modified risk ranking score to each of the DEOS groups. Preferably, each of the modified risk ranking scores is at least partially based on at least one of a number of the individual users of the multiple users having permissions to the DEOS group, a level of sensitivity of the DEOS material in the DEOS group and the organization identifiers of the individual users having permissions to the DEOS group.

In accordance with a preferred embodiment of the present invention, the method further includes providing a permissions analytics output notification including at least some of the modified risk ranking scores.

There is also provided in accordance with another preferred embodiment of the present invention a system for dynamically refining access rules for governing control of access by multiple users to a multiplicity of data elements or services (DEOSs) stored in or accessed through at least one access controllable network element (ACONE), the system including a permissions input unit for collecting initial permissions to ones of the multiplicity of DEOSs, each of the multiplicity of DEOSs including DEOS material, an access event tracker for receiving notifications of actual access events of ones of the multiple users to ones of the multiplicity of DEOSs and for periodically receiving updated notifications of actual access events, an initial user group generator for generating initial user groups, each of the initial user groups including one or more of the multiple users, a modified user group generator for generating, for each of the initial user groups, based at least partially on the updated notifications of actual access events, a list of those of the multiple users who have accessed at least one of the multiplicity of DEOSs and based at least partially on the lists, generating modified user groups, each of the modified user groups including a selected subset of the multiple users, a modified permissions generator for, based at least partially on the modified user groups, generating modified permissions to at least one of the multiplicity of DEOSs and a modified permissions output unit for, based on the modified permissions to, updating the initial permissions to ones of the multiplicity of DEOSs, thereby enabling, for particular DEOSs of the multiplicity of DEOSs, only users in a corresponding one of the selected subset of the multiple users to access the particular DEOSs.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Access control policies typically determine which users have access to an organization's stored data or services on various computer systems. Preferably, the data security policy is updated periodically to reflect changes in structure, personnel makeup and needs of the organization. Particularly in large, complex organizations whose structure and personnel change frequently, updating the data security policy can often be inefficient, inaccurate, and impractical.

In many organizations an unacceptably high proportion of users have overly broad access privileges, creating an unnecessary security exposure for the organization. Removing the overly broad access privileges is difficult, and often leads to an unintended removal of access privileges to necessary data or services. Hence, there is a need for a resource-light, highly accurate and time-efficient method and system for controlling user permissions to improve data security, prevent fraud, and improve company productivity.

Figure 1:
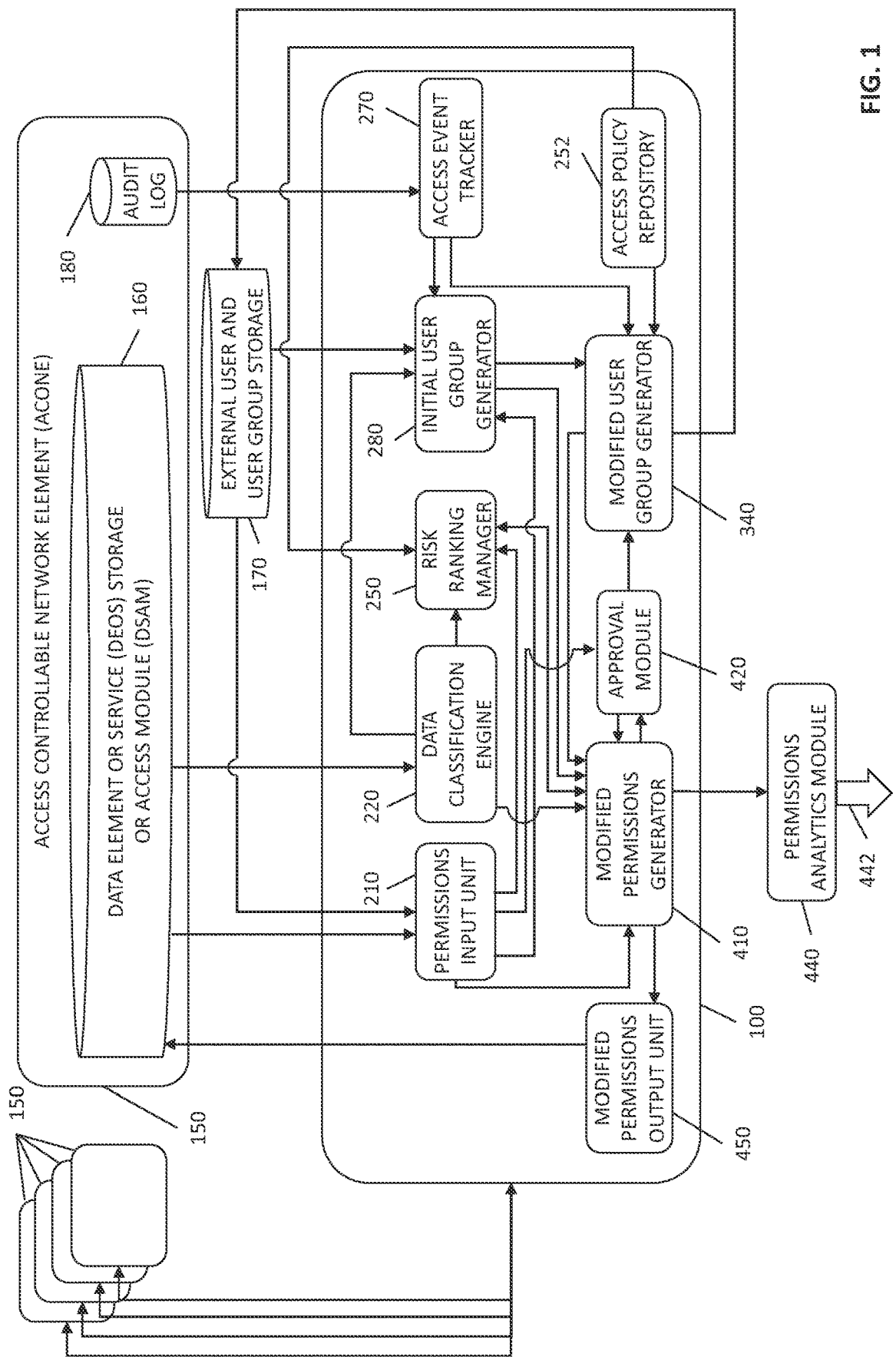
FIG. 1 is a simplified functional block diagram of a system for managing access permissions to data elements or services (DEOSs) in a multiplicity of access controllable network elements (ACONEs), constructed and operative in accordance with a preferred embodiment of the present invention.
Figure 2:
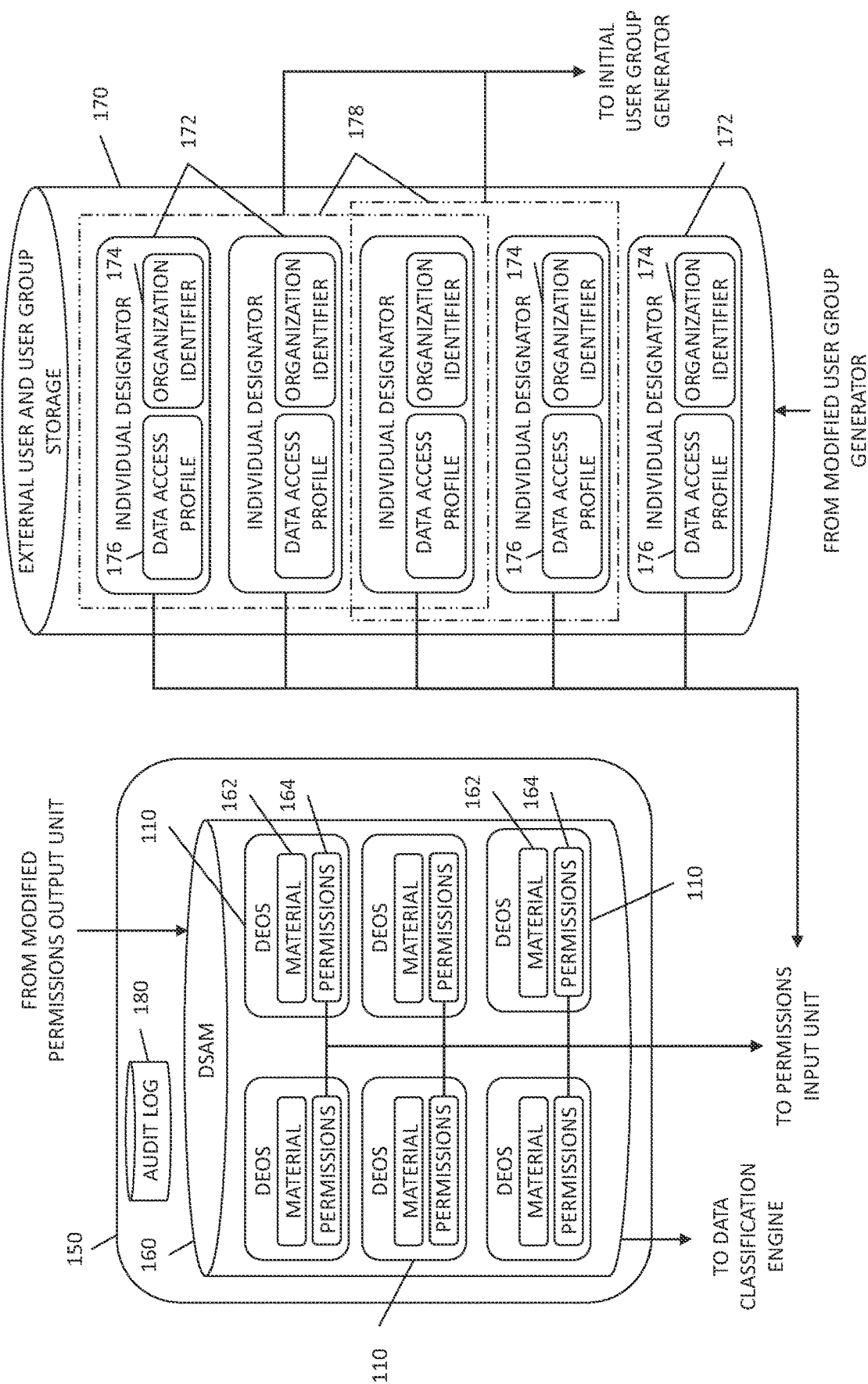
FIG. 2 is a simplified functional block diagram of a portion of the system of FIG. 1, showing particularly details of system interaction with external components.
Figure 3:
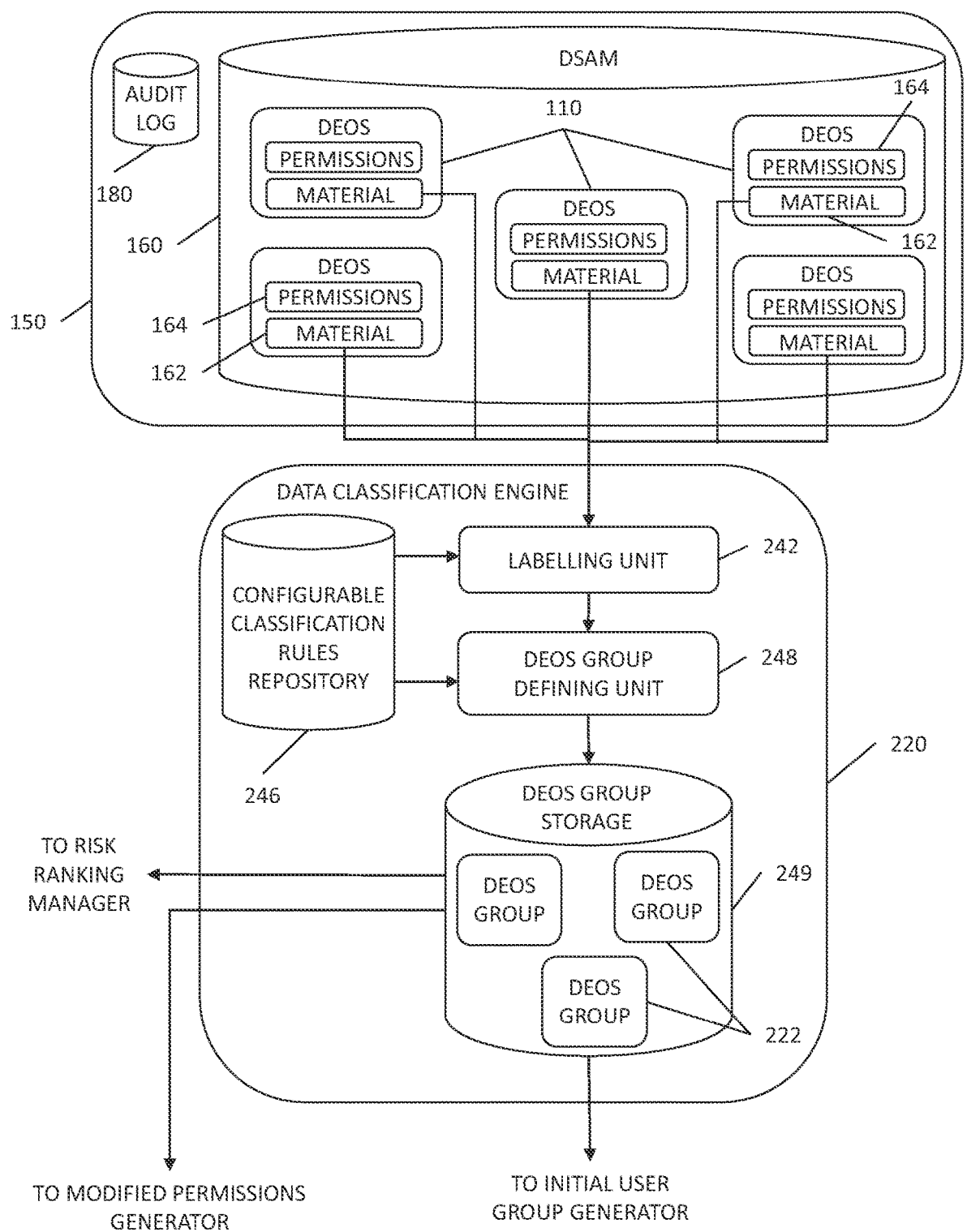
FIG. 3 is a simplified functional block diagram of a portion of the system of FIGS. 1 & 2, showing particularly details of a data classification engine thereof.
Figure 4:
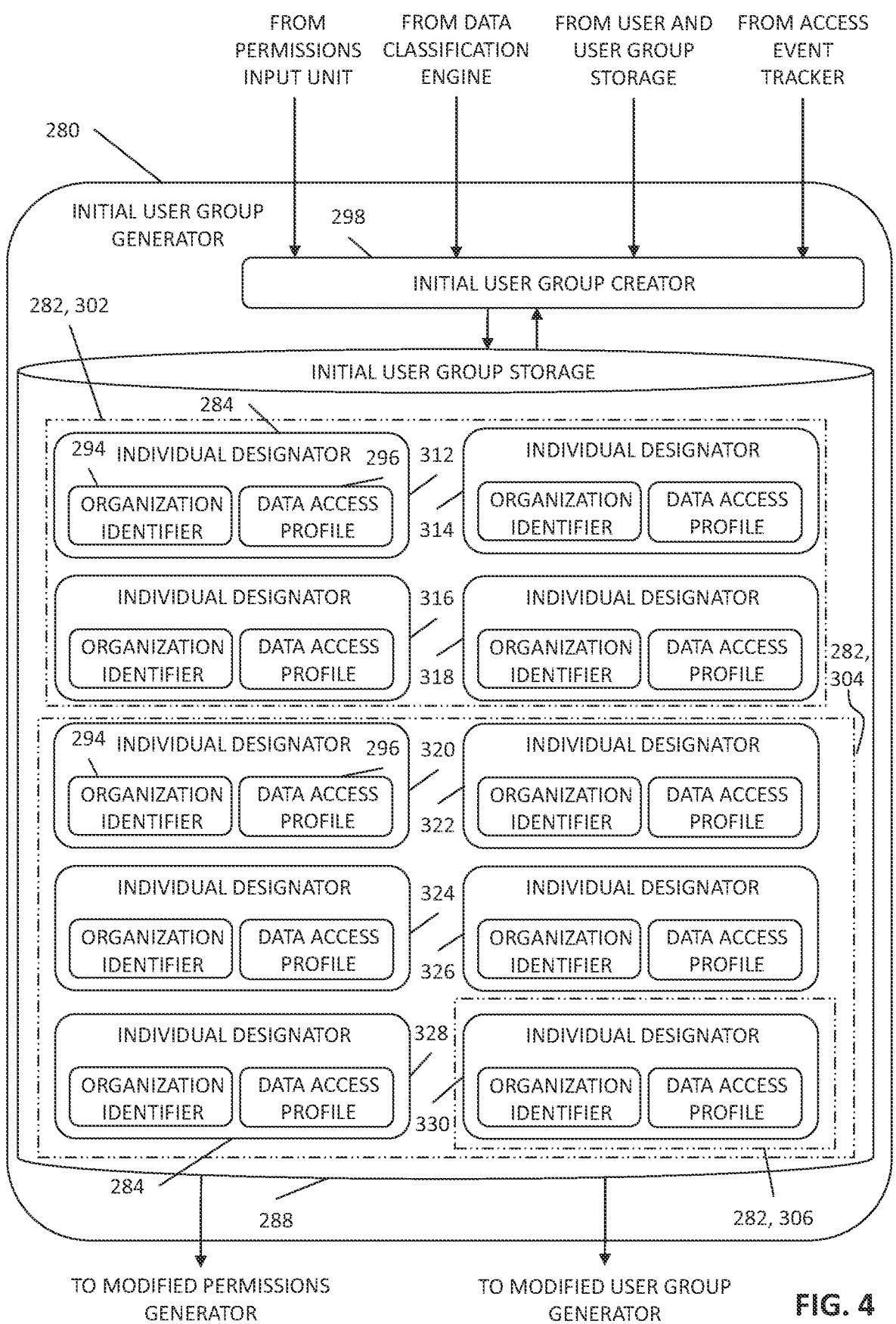
FIG. 4 is a simplified functional block diagram of a portion of the system of FIGS. 1-3, showing particularly details of an initial user group generator thereof.
Figure 5:
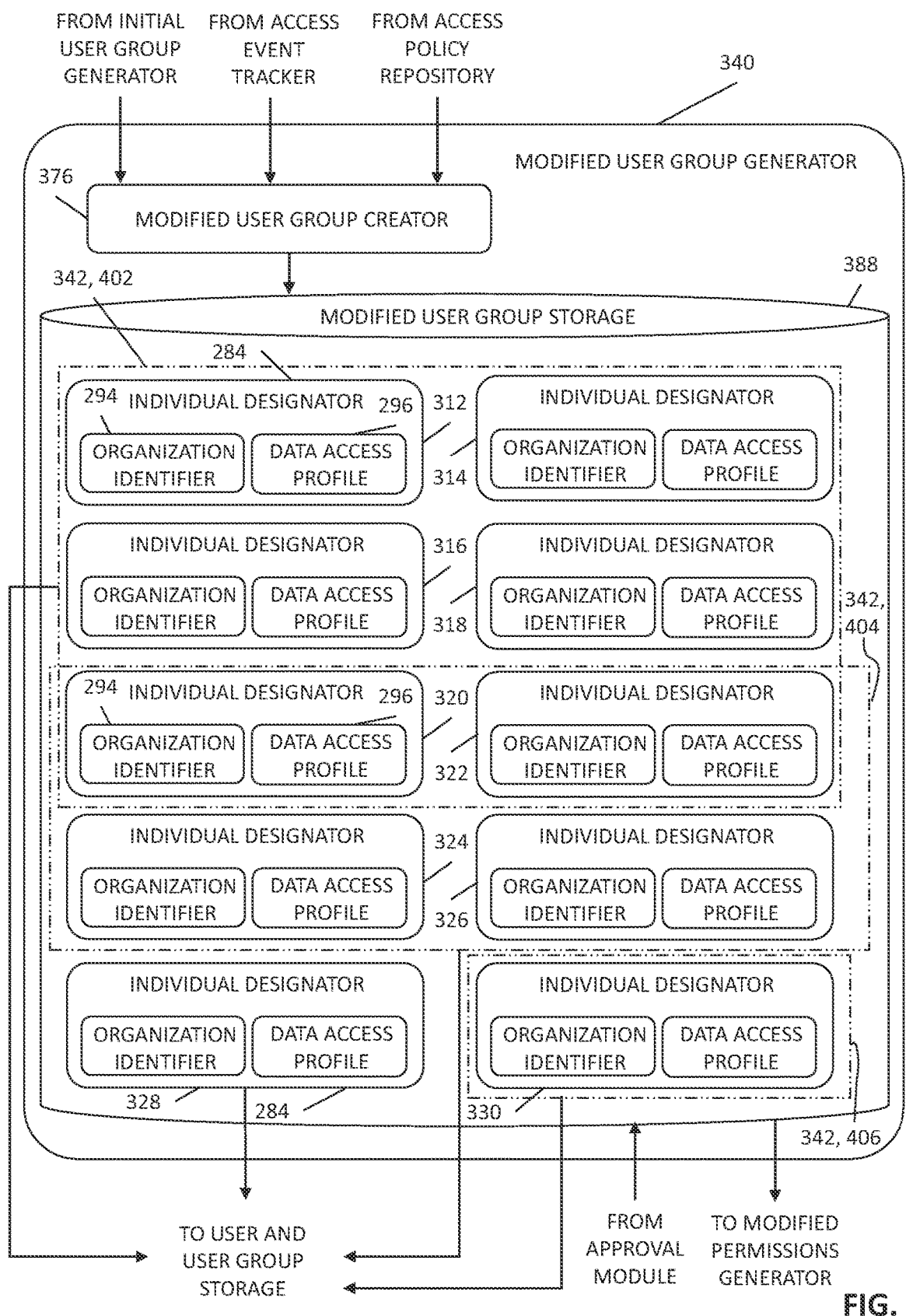
FIG. 5 is a simplified functional block diagram of a portion of the system of FIGS. 1-4, showing particularly details of a modified user group generator thereof.
Figure 6:
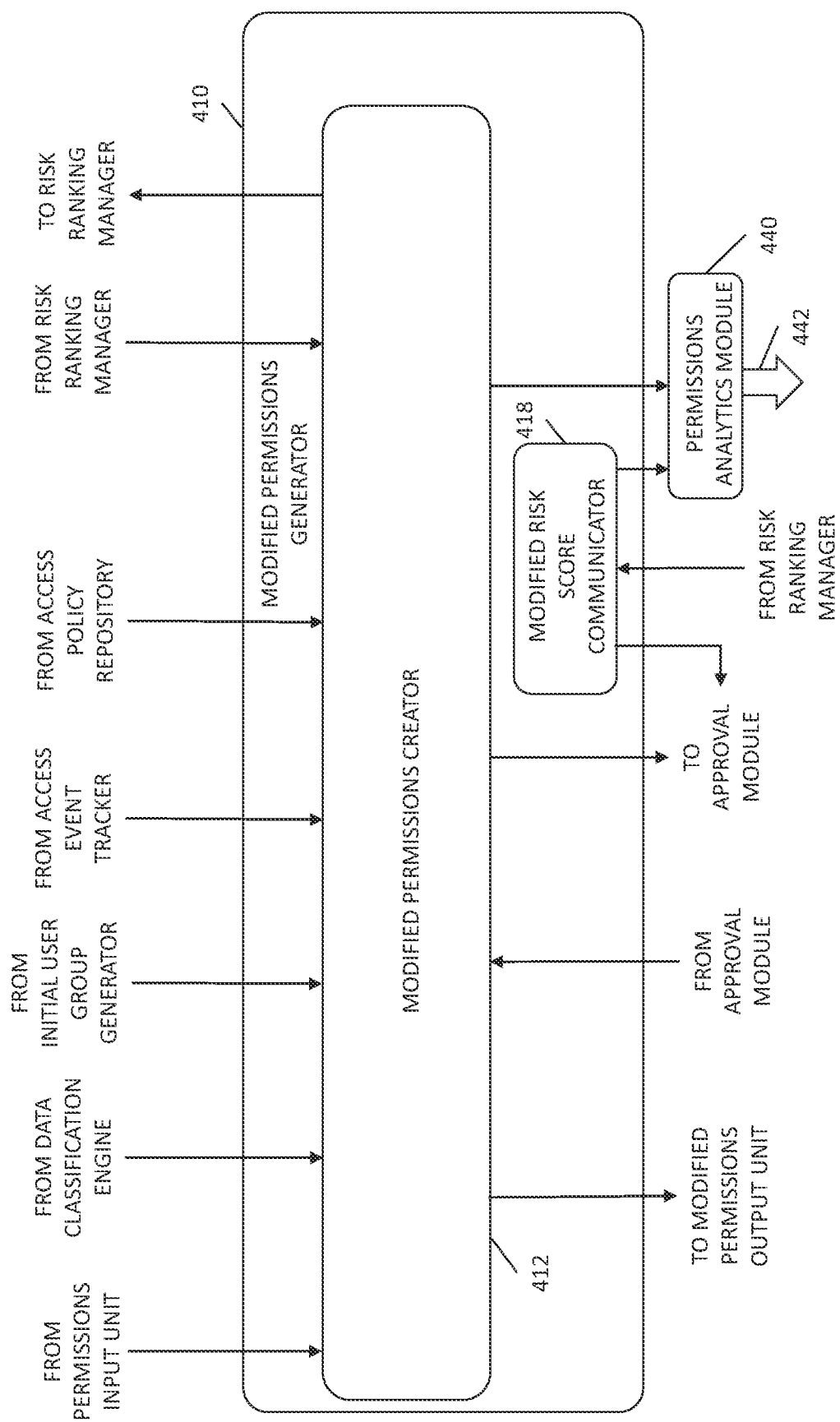
FIG. 6 is a simplified functional block diagram of a portion of the system of FIGS. 1-5, showing particularly details of a modified permissions generator thereof.
Figure 7:
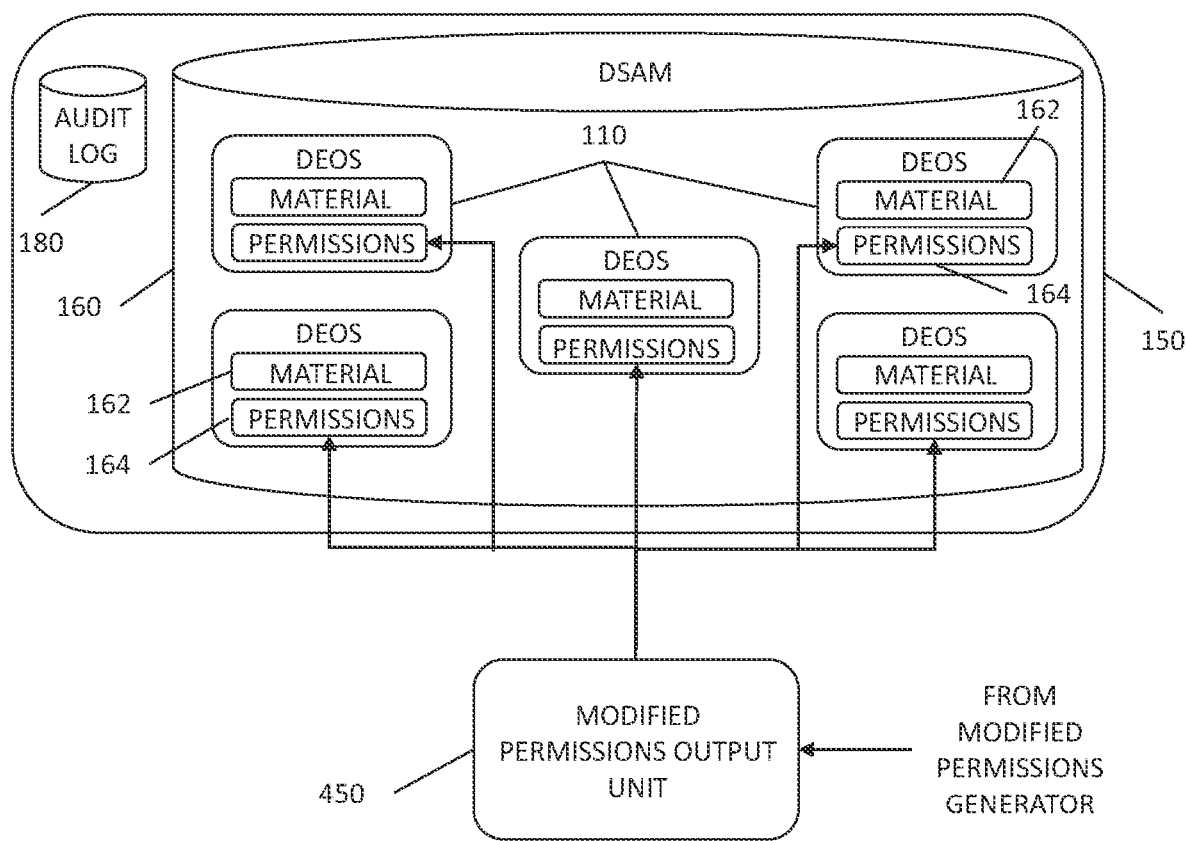
FIG. 7 is a simplified functional block diagram of a portion of the system of FIGS. 1-6, showing particularly details of system interaction with external components.
Figure 8A:
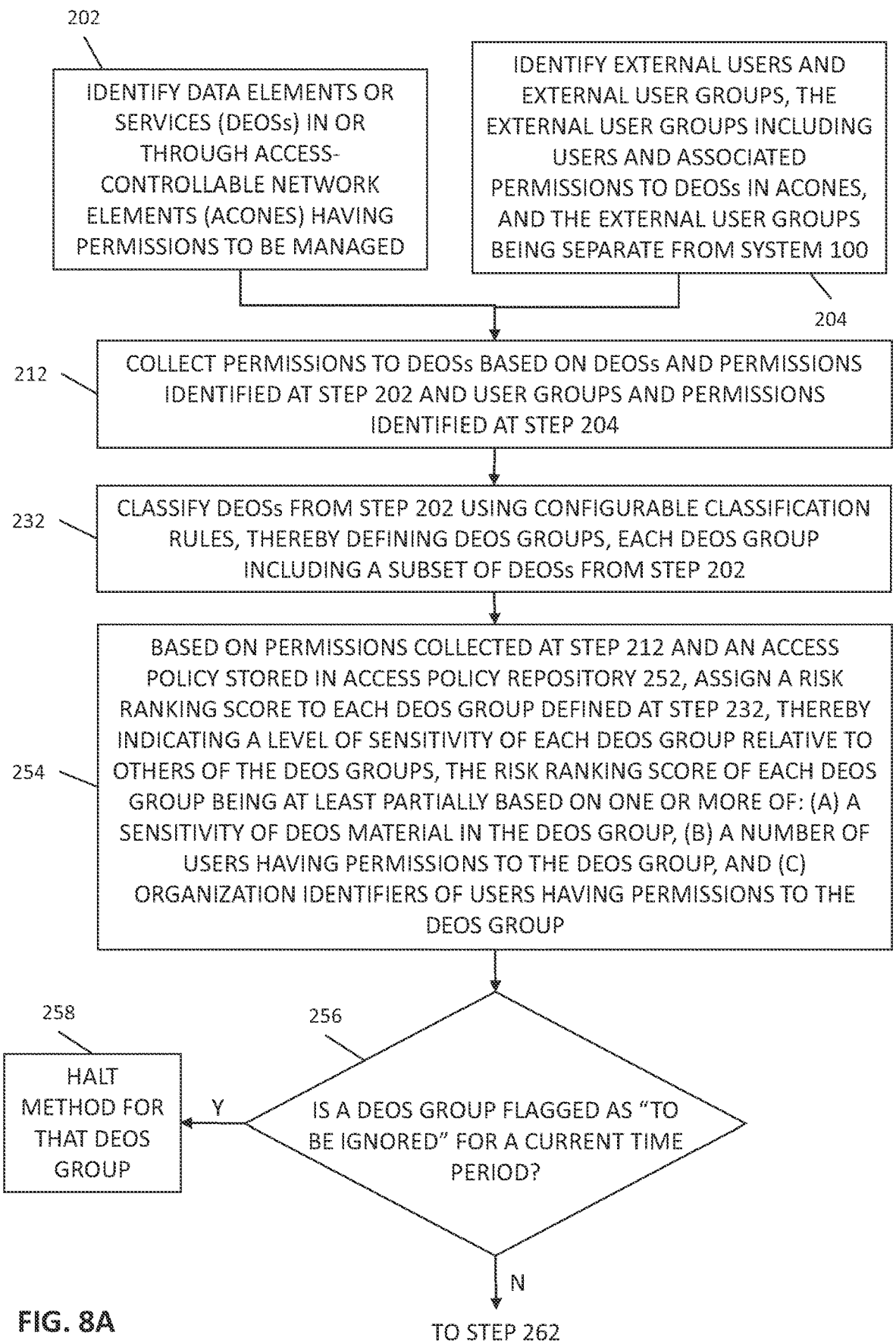
FIGS. 8A, 8B and 8C together are a simplified flow chart illustrating steps in a method for managing access permissions, which is preferably carried out by a system of the type shown in FIGS. 1-7.
Figure 8B:
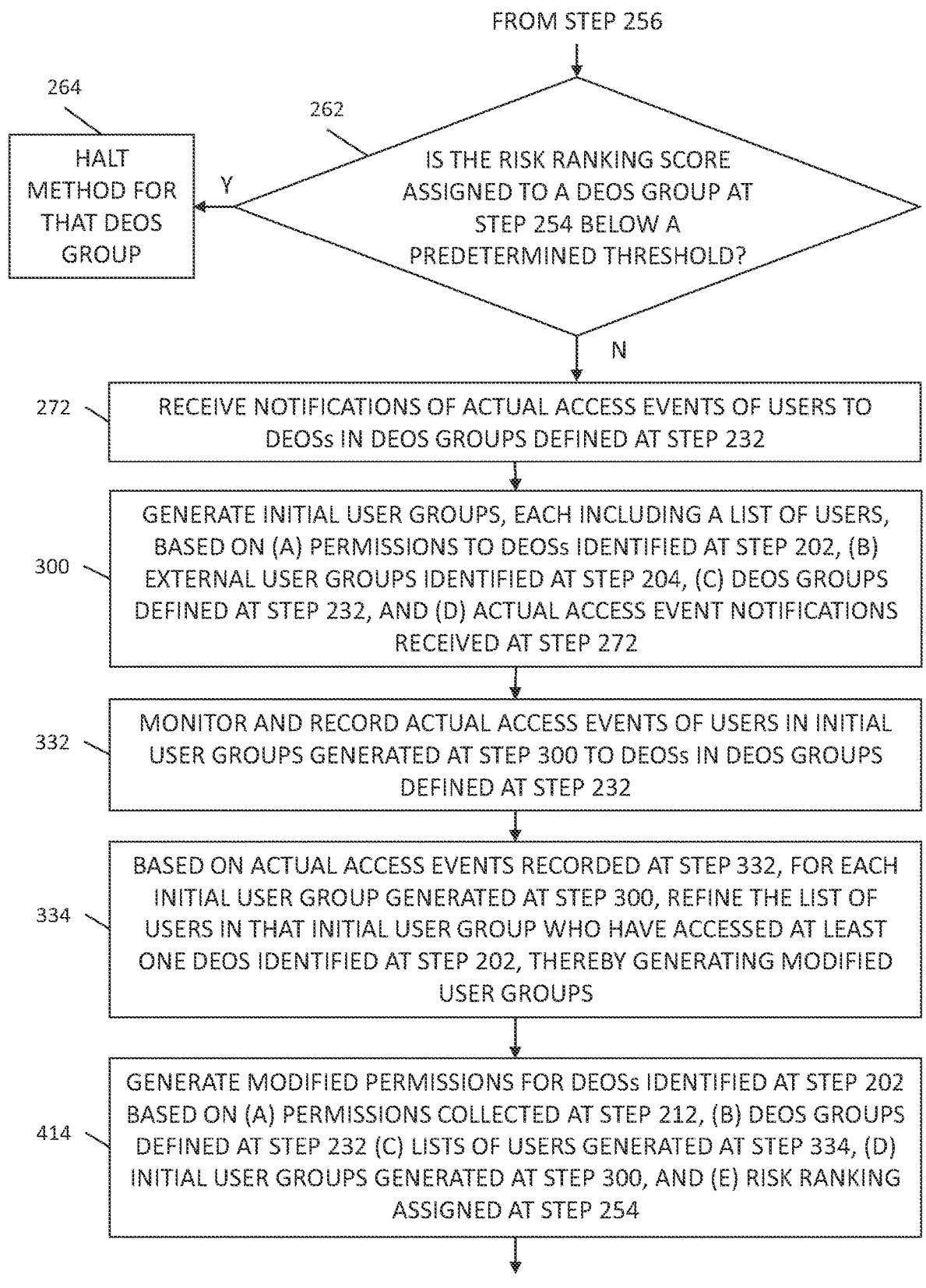
Figure 8C:
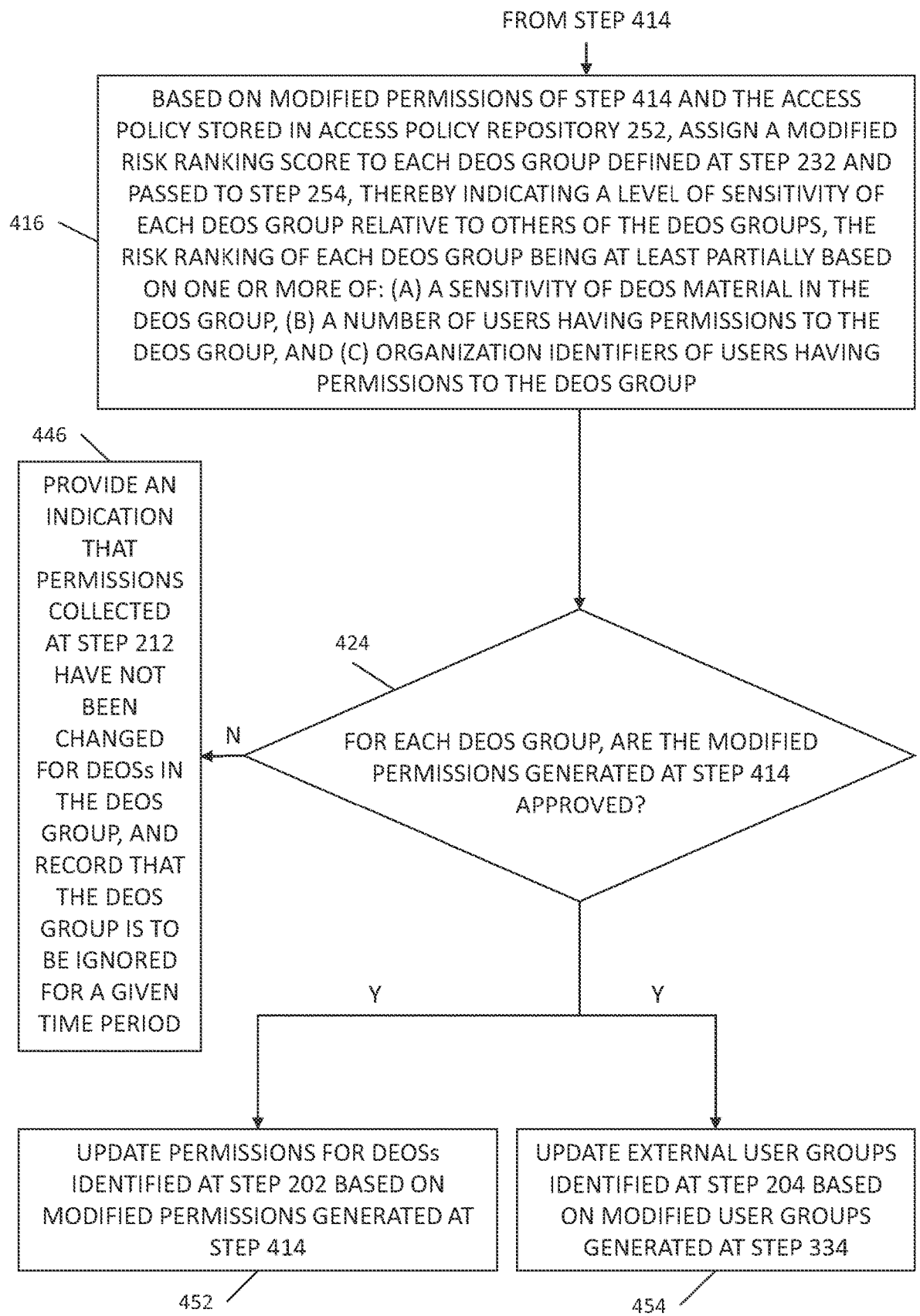

Reference is now made to FIG. 1, which is a simplified functional block diagram of a system 100 for managing access permissions to data elements or services (DEOSs) in a multiplicity of access controllable network elements (ACONEs), constructed and operative in accordance with a preferred embodiment of the present invention; FIG. 2, which is a simplified functional block diagram of a portion of system 100, showing particularly details of system 100 interaction with external components; FIG. 3, which is a simplified functional block diagram of a portion of system 100, showing particularly details of a data classification engine thereof; FIG. 4, which is a simplified functional block diagram of a portion of system 100, showing particularly details of an initial user group generator thereof; FIG. 5, which is a simplified functional block diagram of a portion of system 100, showing particularly details of a modified user group generator thereof; FIG. 6, which is a simplified functional block diagram of a portion of system 100, showing particularly details of a modified permissions generator thereof; FIG. 7, which is a simplified functional block diagram of a portion of system 100, showing particularly details of system 100 interaction with external components; and FIGS. 8A, 8B and 8C, which together are a simplified flow chart illustrating steps in a method for dynamically refining access rules for governing control of access by multiple users to a multiplicity of DEOSs. For DEOSs embodied as data elements, the data elements are typically stored in at least one of the ACONEs. For DEOSs embodied as services, at least one of the ACONEs typically controls access to the services, which are typically stored externally to both system 100 and the ACONEs. The method of FIGS. 8A-8C is preferably implemented on at least one computer, and is preferably carried out by a system of the type of system 100.

System 100 is preferably operative to dynamically refine access rules for governing control of access to a multiplicity of data elements or services (DEOSs) 110. It is appreciated that system 100 may be operative to dynamically refine access rules for enterprise networks, which may include at least thousands of DEOSs 110, millions of DEOSs 110, or billions of DEOSs 110. As seen particularly in FIGS. 2 & 3, DEOSs 110 are preferably stored in or accessed through at least one access controllable network element (ACONE) 150 associated with the enterprise network, preferably in a DEOS storage or access module (DSAM) 160, such as a database, File Server, Network Firewall, DNS Gateway, Secure Web Gateway or Email Gateway, forming part of ACONE 150. Each of DEOSs 110 typically includes DEOS material 162 and DEOS permissions 164.

ACONE 150 is preferably embodied as, inter alia, a platform, such as a firewall, an Internet proxy, a Domain Name System (DNS) gateway, an email server, a database, a file server or a productivity application. An important function of ACONE 150 is typically to selectively allow access to DEOSs 110, which are preferably embodied as, inter alia, a plurality of computer-executable programs; a plurality of data packets; a category of web sites, such as web sites associated with any of, inter alia, gaming, alcohol and drugs; a plurality of IP addresses, such as IP addresses associated with malware; a plurality of correspondent categories, such as, inter alia, partners, customers and uncategorized; a plurality of lists of email addresses; a plurality of folders or volumes of files, database schemas or tables.

DEOS material 162 is typically a raison d'être of a DEOS 110. For example, a DEOS 110 that is embodied as a text file often includes DEOS material 162 that is embodied as text that is displayed in a main portion of the DEOS 110. Similarly, a DEOS 110 that is embodied as a video and/or audio file often includes DEOS material 162 that is embodied as video and/or audio media to be displayed when the DEOS 110 is opened. As additional examples, a DEOS 110 that is embodied as a list of email addresses often includes DEOS material 162 that is embodied as values of email addresses in the list, a DEOS 110 that is embodied as a web site often includes DEOS material 162 that is embodied as content of that web site, and a DEOS 110 that is embodied as an IP address often includes DEOS material 162 that is embodied as historic actions associated with that IP address.

It is appreciated that for a user to be able to perform specific actions relating to a particular DEOS 110, such as, inter alia, to access the DEOS 110, to communicate with the DEOS 110, to open the DEOS 110, to modify the DEOS 110, to copy the DEOS 110, to save the DEOS 110 or to send the DEOS 110, for example as an email attachment, the user must be associated with necessary permissions to the DEOS 110. Permissions to one or more DEOSs 110 are also referred to herein as "access rules." Preferably, permissions associated with each DEOS 110 are stored in DEOS permissions 164 of that DEOS 110.

Similarly, for DEOSs embodied as web sites, access rules maintained by system 100 preferably control which web sites a user can access via a web gateway. By way of further example, for DEOSs embodied as domains, access rules maintained by system 100 preferably control which domains can be resolved by a DNS gateway. Additionally, for DEOSs embodied as email addresses and/or computer files, access rules maintained by system 100 preferably control to which email addresses users can send particular types of computer files, such as confidential documents. Similarly, for DEOSs embodied as web sites and/or computer files, access rules maintained by system 100 preferably control to which web sites users can upload particular types of computer files, such as confidential documents, and from which web sites users can download particular types of computer files, such as executable (EXE) computer files.

It is appreciated that a single system 100 may refine access rules for one ACONE 150 or multiple ACONEs 150, and multiple ones of ACONEs 150 may be of a single type, such as a multiplicity of file servers, or of differing types from one another, such as an email server, a DNS gateway, and a plurality of productivity applications. Similarly, DEOSs 110 may be of a single type, such as a multiplicity of computer files, or of differing types from one another, such a multiplicity of computer files, a multiplicity of email addresses, a multiplicity of IP addresses, and a plurality of computer-executable programs.

System 100 preferably interfaces with one or more ACONEs 150, thereby controlling access to DEOSs 110 associated therewith. Additionally, system 100 preferably interfaces with an external user and user group (UUG) storage 170, which may be included in one or more ACONEs 150, or separate from ACONEs 150. External UUG storage 170 is preferably separate from system 100, such as in the embodiment of FIG. 1. Additionally, external UUG storage 170 may be embodied as a single storage module, such as a single database, or as multiple storage modules, which may be in a single location or in disparate locations.

As seen particularly in FIG. 2, external UUG storage 170 typically stores a plurality of individual designators 172. Each individual designator 172 corresponds to an individual user and preferably includes an organization identifier 174 and a data access profile 176. Organization identifier 174 includes information about the individual user represented by individual designator 172, including at least one of, inter alia, a user role, a user job title, a user department, a user employment status, a user customer status, a user membership status, a user tenure and a user geographic location. Additionally, organization identifier 174 may include personal information associated with the user, such as any or all of, inter alia, a name of the user, identification (ID) information of the user, such as an employee ID number of the user, and contact information for the user. Data access profile 176 includes information about at least one of permissions and data access history of the individual user represented by individual designator 172, and preferably indicates permissions of the individual user represented by that individual designator 172 to DEOSs 110.

In some embodiments of the present invention, at least some individual designators 172 are grouped into existing external user groups 178. External user groups 178 are preferably also stored in external UUG storage 170. Individual designators 172 may belong to no external user groups 178, to one external user group 178, or to multiple external user groups 178. External user groups 178 may group individual designators 172 in any suitable groupings, and may correspond to, for example, work teams, family members and customer tiers.

In addition to DSAM 160, ACONE 150 preferably includes an audit log 180. Audit log 180 preferably monitors and records actual access events of users to DEOSs 110.

As seen in FIG. 8A, the method of FIGS. 8A-8C begins with a step 202 and a step 204. At step 202, DEOSs 110 in ACONEs 150 having permissions 164 to be managed are identified by system 100. At step 204, system 100 identifies external individual users, represented by individual designators 172, and external user groups 178, each including one or more individual designators 172 associated with the individual users. Also at step 204, system 100 identifies permissions of the external users to DEOSs 110 in ACONEs 150. The permissions identified at step 204 are preferably read from data access profiles 176 of individual designators 172. It is appreciated that external user groups 178 are preferably separate from system 100. It is appreciated that steps 202 and 204 may be performed either concurrently or sequentially, with either step 202 preceding step 204 or step 204 preceding step 202.

As seen in FIG. 1, system 100 preferably includes a permissions input unit 210 for collecting initial permissions to DEOSs 110. As seen in FIG. 8A, at a step 212, the initial permissions collected by permissions input unit 210 preferably include at least one of, and more preferably both of, permissions to DEOSs 110 received from metadata associated particularly with DEOSs 110 and received from metadata associated particularly with users. Metadata associated particularly with DEOSs 110 includes permissions 164 identified at step 202. Metadata associated particularly with users includes external user groups 178 and permissions preferably read from data access profiles 176 of individual designators 172 identified at step 204.

As seen particularly in FIGS. 1 & 3, system 100 preferably additionally includes a data classification engine 220 for classifying DEOSs 110 using configurable classification rules, thereby defining a plurality of DEOS groups 222, each of which includes a subset of DEOSs 110, as seen in FIG. 8A at a next step 232. In one embodiment of the present invention, each of DEOSs 110 belongs to only a single DEOS group 222. In an alternative embodiment of the present invention, some DEOSs 110 may belong to a single DEOS group 222, and others of DEOSs 110 may belong to multiple DEOS groups 222. Furthermore, a DEOS group 222 may include DEOSs 110 from only a single storage location or access module or from disparate storage locations or access modules across the enterprise network, such as different DSAMs 160 within a single ACONE 150 or different DSAMs 160 from different ACONEs 150.

As seen particularly in FIG. 3, data classification engine 220 preferably includes a labelling unit 242, which preferably classifies DEOSs 110 from at least one ACONE 150. It is appreciated that, for simplicity, only a single ACONE 150 is shown in FIG. 3; however, system 100, including labelling unit 242 of data classification engine 220 thereof, may receive information from and classify DEOSs 110 from multiple ACONEs 150.

Preferably, labelling unit 242 assigns a classification label to each of DEOSs 110, thereby classifying DEOSs 110. The classification label assigned to each of DEOSs 110 preferably indicates a level of sensitivity of that DEOS 110, and the level of sensitivity is typically at least partially based on DEOS material 162 of that DEOS 110. For example, a DEOS 110 with DEOS material 162 including only well-known quotations will typically have a first sensitivity, while a DEOS 110 with DEOS material 162 including bank account numbers will have a second sensitivity different from the first sensitivity.

In order to label DEOSs 110, labelling unit 242 receives information regarding DEOSs 110 and the DEOS material 162 thereof from DSAM 160, as well as information regarding labeling rules, such as definitions and similarity rules, from a configurable classification rules repository 246 of data classification engine 220. Labelling unit 242 and configurable classification rules repository 246 preferably provide information regarding each of DEOSs 110 to a DEOS group defining unit 248 of data classification engine 220, which allows DEOS group defining unit 248 to define DEOS groups 222. Upon definition thereof, DEOS groups 222 are preferably stored in a DEOS group storage 249 forming part of data classification engine 220. Preferably, DEOS groups 222 are stored in DEOS group storage 249 as a table, including an identifier of one or more specific DEOSs 110 and a storage location of each of the one or more specific DEOS 110 included in each of DEOS groups 222. However, actual DEOSs 110 are preferably not stored in DEOS group storage 240.

As seen particularly in FIG. 1, system 100 preferably further includes a risk ranking manager 250 and an access policy repository 252. As seen particularly in FIG. 8A, at a next step 254 in the method of FIGS. 8A-8C, risk ranking manager 250 ranks DEOS groups 222 by order of potential risk, based on the initial permissions collected at step 212 and an access policy stored in access policy repository 252. More specifically, risk ranking manager 250 assigns a risk ranking score to each of DEOS groups 222, thereby indicating a level of sensitivity and/or potential risk of each DEOS group 222 relative to other DEOS groups 222. Preferably, the risk ranking score of each DEOS group 222 is at least partially based on one or more of a sensitivity of DEOS material 162 of DEOSs 110 in the DEOS group 222, a number of users having permissions to the DEOS group 222 and organization identifiers 174 of users having permissions to the DEOS group 222.

Regarding sensitivity of DEOS material 162 in a DEOS group 222, risk ranking manager 250 typically ranks a DEOS group 222 including DEOSs 110 which have been assigned, by labelling unit 242, classification labels indicating sensitive DEOS material as having a higher potential risk than another DEOS group 222 including DEOSs 110 which have been assigned, by labelling unit 242, classification labels indicating non-sensitive DEOS material. Similarly, risk ranking manager 250 typically ranks a DEOS group 222 including DEOSs 110 which have been assigned, by labelling unit 242, classification labels indicating a relatively highly-sensitive DEOS material, as having a higher potential risk than another DEOS group 222 including DEOSs 110 which have been assigned, by labelling unit 242, classification labels indicating a relatively low-sensitive DEOS material.

Regarding a number of users having permissions to the DEOS group 222, risk ranking manager 250 typically ranks a DEOS group 222 to which relatively many users have permissions as having a higher potential risk than another DEOS group 222 to which relatively few users have permissions.

Regarding organization identifiers 174 of users having permissions to the DEOS group 222, risk ranking manager 250 typically ranks a DEOS group 222 to which relatively untrusted users have permissions as having a higher potential risk than another DEOS group 222 to which relatively trusted users have permissions. It is appreciated that a user trust level may be based on user role. For example, risk ranking manager 250 typically ranks a DEOS group 222 to which contractors have permissions as having a higher potential risk than another DEOS group 222 to which only organization-employees have permissions. Similarly, risk ranking manager 250 typically ranks a DEOS group 222 to which students have permissions as having a higher potential risk than another DEOS group 222 to which only professors have permissions.

In a preferred embodiment of the present invention, other information, which is preferably included in organization identifiers 174, in addition to user role, is also considered by risk ranking manager 250 in assigning a risk ranking score to a DEOS group 222. For example, risk ranking manager 250 typically ranks a DEOS group 222 to which users associated with relatively short tenures have permissions as having a higher potential risk than another DEOS group 222 to which only users having relatively long tenures have permissions. Similarly, risk ranking manager 250 may consider, inter alia, a user job title, a user department, a user customer status, a user membership status and a user geographic location in assignment of a risk ranking score to a DEOS group 222.

Specific factors considered by risk ranking manager 250, along with a relative weighting thereof, are preferably determined by the access policy stored in access policy repository 252. In a preferred embodiment of the present invention, the access policy stored in access policy repository 252 is configurable, and thus is fully or partially customizable.

The access policy stored in access policy repository 252 preferably determines, inter alia, a duration for which permissions are retained by users after notifications of actual access events to DEOSs 110. In one embodiment of the present invention, the duration for which permissions are retained by users after notifications of actual access events to DEOSs 110 is at least partially based on the risk ranking score assigned to the DEOS groups 222, and thus to the DEOSs 110 included therein, by risk ranking manager 250 at step 254.

Optionally, at a next step 256 of the method of FIGS. 8A-8C, a determination is made whether each DEOS group 222 is flagged as "TO BE IGNORED" for a current time period. As seen in FIG. 8A, at a next step 258, the method of FIGS. 8A-8C is preferably halted for all DEOS groups 222 that are flagged as "TO BE IGNORED" for a current time period. The method of FIGS. 8A-8C preferably continues to a next step 262 for all DEOS groups 222 that are not flagged as "TO BE IGNORED" for a current time period. Flagging DEOS groups 222 as "TO BE IGNORED" is discussed in more detail hereinbelow with particular reference to FIGS. 6 and 8C.

As seen in FIG. 8B, at step 262, for each DEOS group 222, a determination is made whether the risk ranking score assigned to that DEOS group 222 by risk ranking manager 250 at step 254 is below a predetermined threshold. For each DEOS group 222 having a risk ranking score below the predetermined threshold, the method of FIGS. 8A-8C is preferably halted, as seen in next step 264. The method of FIGS. 8A-8C preferably continues for DEOS groups 222 having a risk ranking score that is not below the predetermined threshold.

As seen particularly in FIG. 1, system 100 additionally includes an access event tracker 270, which preferably receives, at a next step 272 of the method of FIGS. 8A-8C, as seen in FIG. 8B, from audit log 180 of at least one ACONE 150, notifications of actual access events of users to DEOS groups 222, and more specifically to DEOSs 110 included therein. It is appreciated that the actual access events are actions associated with a user, such as, inter alia, a viewing of a DEOS 110 by a user, a modification of a DEOS 110 by a user or a saving of a DEOS 110 by a user.

Turning now particularly to FIGS. 1 and 4, system 100 preferably additionally includes an initial user group generator 280 for generating a plurality of initial user groups 282. Preferably, each initial user group 282 includes a list of users, each list being at least partially based on at least one of permissions to DEOSs 110 identified at step 202, external user groups 178 identified at step 204, DEOS groups 222 defined at step 232 and actual access event notifications received by access event tracker 270 at step 272. In one embodiment of the present invention, the notifications received by access event tracker 270 at step 272 are notifications of actual access events to DEOSs 110 in more than one of ACONEs 150.

In one embodiment of the present invention, each of the users belongs to only a single initial user group 282. In an alternative embodiment of the present invention, one or more of the users may belong to a single initial user group 282, and one or more different users may belong to multiple initial user groups 282.

As seen particularly in FIG. 4, each of the users is preferably represented by an individual designator 284. Individual designators 284 are preferably stored in an initial user group storage 288 and correspond to individual designators 172 stored in external UUG storage 170. Preferably, each individual designator 284 includes an organization identifier 294 and a data access profile 296.

Typically, each organization identifier 294 includes some or all of the information included in a corresponding one of organization identifiers 174. Data access profile 296 designates a subset of permissions for the user associated with that individual designator 284. In a preferred embodiment of the present invention, data access profile 296 designates permissions to DEOSs 110 in more than one ACONE 150. In another preferred embodiment of the present invention, data access profile 296 designates permissions to DEOSs 110 in a single ACONE 150.

As seen in FIG. 4, initial user group generator 280 preferably includes an initial user group creator 298. As seen in FIG. 8B, initial user group creator 298 preferably creates initial user groups 282 at a step 300 of the method of FIGS. 8A-8C. Typically, initial user group creator 298 creates a plurality of initial user groups 282. It is appreciated that if a user has permissions for one or more DEOSs 110 in a particular DEOS group 222, then that user is preferably given permissions for all DEOSs 110 in that particular DEOS group 222.

FIG. 4 shows multiple initial user groups 282 and individual designators 284. Typically, system 100 includes which may include at least thousands, tens of thousands, hundreds of thousands, millions, or billions of initial user groups 282 and individual designators 284, respectively. For simplicity, FIG. 4 shows a plurality of only exemplary initial user groups 302, 304 and 306. Initial user group 302 includes exemplary individual designators 312, 314, 316 and 318. Initial user group 304 includes exemplary individual designators 320, 322, 324, 326, 328 and 330. Initial user group 306 includes exemplary individual designator 330. It is appreciated, as seen from exemplary individual designator 330, which is includes in both exemplary initial user group 304 and in exemplary initial user group 306, that a single individual designator 284 may be included in multiple initial user groups 282.

As seen in FIG. 8B, at a next step 332, access event tracker 270 preferably monitors and records actual access events of users in initial user groups 282 generated at step 300 to DEOSs 110 in DEOS groups 222 defined at step 232. It is appreciated that the monitoring and recording of actual access events at step 332 constitutes periodically receiving updated notifications of actual access events, and updating the notifications of actual access events received at step 272. The method of FIGS. 8A-8C then proceeds to a next step 334.

Turning now particularly to FIGS. 1 and 5, system 100 preferably additionally includes a modified user group generator 340 for generating a plurality of modified user groups 342 at step 334, seen in FIG. 8B. Preferably, system 100 periodically reviews the actual access events of step 332, and modified user group generator 340 defines a plurality of modified user groups 342 based on the review.

The access policy stored in access policy repository 252 preferably determines a duration for which permissions are retained by users after actual access events to DEOSs 110. Additionally, the access policy stored in access policy repository 252 determines a periodicity at which system 100 reviews the actual access events of steps 272 and 332.

Modified user group generator 340 preferably includes a modified user group creator 376, which generates modified user groups 342 at step 334. Modified user group creator 376 preferably generates modified user groups 342 based on the actual access events recorded at step 332. For each initial user group 282 generated at step 300, modified user group creator 376 preferably generates modified user groups 342 by refining the list of users in a corresponding initial user group 282 to include only those users who have accessed at least one DEOS 110 identified at step 202 to which that initial user group 282 has permissions.

Each modified user group 342 includes individual designators 284 corresponding to the users included in the list for that modified user group 342. Modified user group generator 340 preferably further includes a modified user group storage 388, in which modified user groups 342 are stored. For simplicity, FIG. 5 shows a plurality of only exemplary modified user groups 402, 404 and 406, which correspond to initial user groups 302, 304 and 306, respectively.

Modified user group 402 includes individual designators 312, 314, 316, 318, 320 and 322. In this example, both modified user group 402 and corresponding initial user group 302 include users having permissions to the same set of DEOSs 110. However, initial user group 302 includes users having permissions to the set of DEOSs 110 at step 300 of the method of FIGS. 8A-8C, and modified user group 402 includes users who have accessed the set of DEOSs 110 between steps 300 and 334 of the method of FIGS. 8A-8C. In this exemplary use case, users with individual designators 320 and 322 were granted permissions to and accessed the set of DEOSs 110 after step 300 of the method of FIGS. 8A-8C, and before step 334 of the method of FIGS. 8A-8C. Therefore, modified user group 402 includes individual designators 320 and 322, even though individual designators 320 and 322 are not included in initial user group 302.

Modified user group 404 includes individual designators 320, 322, 324 and 326. In this example, both modified user group 404 and corresponding initial user group 304 include users having permissions to the same set of DEOSs 110. However, initial user group 304 includes users having permissions to the set of DEOSs 110 at step 300 of the method of FIGS. 8A-8C, and modified user group 404 includes users who have accessed the set of DEOSs 110 between steps 300 and 334 of the method of FIGS. 8A-8C. In this exemplary use case, users with individual designators 328 and 330 did not have any actual access events associated with the set of DEOSs 110 after step 300 and before step 334. Therefore, although initial user group 304 includes individual designators 328 and 330, individual designators 328 and 330 are not included in corresponding modified user group 404. It is appreciated that individual designator 328 is not shown as belonging to any modified user group 342.

Modified user group 406 includes individual designator 330. In this example, both modified user group 406 and initial user group 306 includes a user having permissions to the same set of DEOSs 110, and there is no difference between the individual designators 284 included in each of modified user group 406 and corresponding initial user group 306. Nevertheless, it is appreciated that initial user group 306 includes users having permissions to the set of DEOSs 110 at step 300 of the method of FIGS. 8A-8C, and modified user group 406 includes users who have accessed the set of DEOSs 110 between steps 300 and 334 of the method of FIGS. 8A-8C.

Turning now particularly to FIGS. 1 and 6, system 100 preferably additionally includes a modified permissions generator 410 for generating modified permissions for DEOSs 110 identified at step 202. As seen particularly in FIG. 6, modified permissions generator 410 preferably includes a modified permissions creator 412, which preferably creates the modified permissions at least partially based on one or more of the initial permissions collected at step 212, DEOS groups 222 defined at step 232, the lists of users and modified user groups 342 generated by modified user group generator 340 at step 334, initial user groups 282 generated by initial user group generator 280 at step 300, and the risk ranking scores assigned by risk ranking manager 250 at step 254 to the DEOS group 222 to which the DEOS 110 belongs. As seen in FIG. 8B, modified permissions generator 410 preferably generates the modified permissions at a next step 414.

It is appreciated that the initial permissions collected at step 212 preferably include both DEOS permissions 164 to DEOSs 110 identified at step 202 and permissions from data access profiles 176 for the external users and user groups identified at step 204. It is further appreciated that the lists of users and modified user groups 342 generated by modified user group generator 340 at step 334 are based on the actual access events recorded at step 332. Thus, modified permissions are preferably also based on the actual access events recorded at step 332. Regarding the risk ranking scores assigned by risk ranking manager 250 at step 254 to the DEOS group 222 to which the DEOS 110 belongs, modified permissions creator 412 preferably removes permissions more readily from DEOSs 110 identified as having a relatively high risk ranking score than from DEOSs 110 identified as having a relatively low risk ranking score.

As seen particularly in FIG. 8C, at a next step 416, risk ranking manager 250 preferably assigns a modified risk ranking score to each DEOS group 222 defined at step 232 and passed to step 272, thereby indicating a level of sensitivity of each DEOS group 222 relative to others of DEOS groups 222. The modified risk ranking scores are preferably based on modified permissions generated by modified permissions generator 410 at step 414 and the access policy stored in access policy repository 252.

More specifically, the modified risk ranking scores assigned to DEOS groups 222 at step 416 are preferably at least partially based on at least one of a sensitivity of DEOS material 162 in the DEOS group 222, a number of users having permissions to the DEOS group 222, and organization identifiers of users having permissions to the DEOS group 222.

As seen particularly in FIG. 6, modified permissions generator 410 preferably includes a modified risk score communicator 418. As seen particularly in FIG. 1, system 100 preferably includes an approval module 420.

As seen particularly in FIG. 6, modified risk score communicator 418 receives from risk ranking manager 250 the modified risk ranking scores assigned to DEOS groups 222 at step 416. Modified risk score communicator 418 preferably communicates the modified risk ranking scores to approval module 420. Approval module 420 also preferably receives from modified permissions creator 412 the modified permissions created thereby at step 414. As seen particularly in FIG. 1, approval module 420 additionally preferably receives from permissions input unit 210 the initial permissions collected thereby at step 212.

In one embodiment of the present invention, steps 332 and 334 may run multiple times within a single iteration of the method of FIGS. 8A-8C. Alternatively, steps 332, 334, 414 and 416 may run multiple times within a single iteration of the method of FIGS. 8A-8C.

As seen particularly in FIG. 8C, at a next step 424 a determination is made by approval module 420, for each DEOS group 222, whether the modified permissions created by modified permissions creator 412 at step 414 are approved. It is appreciated that the determination made by approval module 420 at step 424 may be fully manual, partially automated or fully automated. Typically, the approval determination of step 424 is controlled by a data owner of DEOSs 110.

The determination made by approval module 420 at step 424 is preferably at least partially based on at least one of the modified risk ranking scores assigned to DEOS groups 222 by risk ranking manager 250 at step 416, a difference between the modified risk ranking scores assigned to DEOS groups 222 by risk ranking manager 250 at step 416 and the risk ranking scores assigned to DEOS groups 222 by risk ranking manager 250 at step 254, modified permissions generated by modified permissions generator 410 at step 414, a difference between modified permissions generated by modified permissions generator 410 at step 414 and the initial permissions collected by permissions input unit 210 at 212, and the access policy stored in access policy repository 252.

In another embodiment of the present invention, the modified permissions generated by modified permissions generator 410 at step 414 are always implemented, and approval module 420 is obviated, as is step 424.

As seen particularly in FIGS. 1 and 6, system 100 preferably further includes a permissions analytics module 440, which is operative to provide a permissions analytics output notification and/or action output (PAONAO) 442. PAONAO 442 preferably includes at least some of the modified risk ranking scores generated by risk ranking manager 250 at step 416, and which are communicated to permissions analytics module 440 by modified risk score communicator 418. PAONAO 442 may be embodied as any or all of, inter alia, a security alarm, an analysis of user behavior and an analysis of system behavior.

PAONAO 442 may be provided manually or automatically, and may be in response to an input from an analysis trigger, such as a query. For example, PAONAO 442 may be provided in response to a user report request or a scheduled time-based query or rule-based query. In a preferred embodiment of the present invention, permissions analytics module 440 is a utilization subsystem of system 100.

Referring again to FIG. 8C, if at step 424 a determination is made that the modified permissions created by modified permissions creator 412 at step 414 for one or more DEOS groups 222 are not approved, then the modified permissions for those DEOS groups 222 are not implemented, and at a next step 446, permissions analytics module 440 preferably provides an indication, such as PAONAO 442, that the initial permissions collected at step 212 have not been changed for DEOSs 110 in those DEOS groups 222. Additionally, PAONAO 442 preferably flags those DEOS groups 222 as "TO BE IGNORED" by the method of FIGS. 8A-8C for a particular time period set by an approver. The approver can be either a human approver or an automated approver part of approval module 420.

In a preferred embodiment of the present invention, the method of FIGS. 8A-8C is run iteratively and fairly frequently, such as daily or hourly. Therefore, it is advantageous for DEOS groups 222 whose permissions are not to be updated by the method of FIGS. 8A-8C to be ignored by the method of FIGS. 8A-8C, as seen above at steps 256 and 258. This reduces computing time and power required by the method of FIGS. 8A-8C and also reduces the number of notifications sent to an approver.

Thus, if the approver does not approve the modified permissions created by modified permissions creator 412 at step 414 for one or more DEOS groups 222 and also flags those DEOS groups 222 as "TO BE IGNORED" for a particular time period, then the method of FIGS. 8A-8C will not generate modified permissions for those DEOS groups 222 for that particular time period, and system 100 will not notify the approver again regarding those DEOS groups 222 for that particular time period. At an end of that particular time period, those DEOS groups 222 will preferably once again have modified permissions generated by the method of FIGS. 8A-8C, and system 100 will once again notify the approver regarding those DEOS groups 222.

In a preferred embodiment of the present invention, the access policy stored in access policy repository 252 does not include information regarding which DEOS groups 222 are flagged as "TO BE IGNORED," because the access policy is global, and the "TO BE IGNORED" flag is for particular DEOS groups 222 and a particular time period only.

In an embodiment wherein the modified permissions generated by modified permissions generator 410 at step 414 are always implemented and approval module 420 is obviated, step 446 is also obviated.

As seen particularly in FIGS. 1 and 7, system 100 preferably additionally includes a modified permissions output unit 450, which, as seen in FIG. 8C, at a next step 452, preferably receives approved modified permissions from modified permissions generator 410 and updates permissions 164 for DEOSs 110 identified at step 202, based on the modified permissions generated at step 414 and approved at step 424.

At a next step 454, as seen in FIG. 8C, modified user group generator 340 preferably updates external user groups 178 identified at step 204 and stored in external UUG storage 170, based on modified user groups 342 generated at step 334 and approval by approval module 420. Preferably, any external user groups 178 that are identical to modified user groups 342 are not overwritten by modified user group generator 340. Thus, step 454 preferably includes multiple sub-steps, namely a lookup sub-step, in which modified user groups 342 are compared to corresponding external user groups 178, and follow-up step, in which external user groups 178 which are not identical to corresponding ones of modified user groups 342 are updated based on modified user groups 342, and external user groups 178 which are identical to modified user groups 342 are not updated by modified user group generator 340.

Also at step 454, modified user group generator 340 preferably updates data access profiles 176 of individual users' individual designators 172 based on modified user groups 342 generated at step 334 and approval by approval module 420. In a preferred embodiment of the present invention, at step 454, system 100 deletes initial user groups 282 and removes permissions associated particularly therewith, after generating modified user groups 342.

Thus, in a preferred embodiment of the present invention, at steps 452 and 454, based on the modified permissions generated at step 414 and on modified user groups 342, system 100 updates the initial permissions to DEOSs 110 collected at step 212, thereby enabling only users in particular ones of modified user groups 342 to access particular ones of DEOSs 110.

It is appreciated that steps 452 and 454 may be performed either concurrently or sequentially, with either step 452 preceding step 454 or step 454 preceding step 452. It will be appreciated by persons skilled in the art that the present invention is not limited to what has been particularly shown and described hereinabove. The scope of the present invention includes both combinations and subcombinations of various features described hereinabove as well as modifications thereof, all of which are not in the prior art.

The invention claimed is:

1. A method for dynamically refining access rules for governing control of access by multiple users to a multiplicity of data elements or services (DEOSs) stored in or accessed through at least one access controllable network element (ACONE), the method being implemented on at least one computer and comprising:
collecting initial permissions to ones of said multiplicity of DEOSs, each of said multiplicity of DEOSs including DEOS material;
receiving notifications of actual access events of ones of said multiple users to ones of said multiplicity of DEOSs;
generating initial user groups, each of said initial user groups including one or more of said multiple users;
periodically receiving updated notifications of actual access events;
generating, for each of said initial user groups, based at least partially on said updated notifications of actual access events, a list of those of said multiple users who have accessed at least one of said multiplicity of DEOSs;
based at least partially on said lists, generating modified user groups, each of said modified user groups including a selected subset of said multiple users;
based at least partially on said modified user groups, generating modified permissions to at least one of said multiplicity of DEOSs; and
based on said modified permissions, updating said initial permissions to ones of said multiplicity of DEOSs, thereby enabling, for particular DEOSs of said multiplicity of DEOSs, only users in a corresponding one of said selected subset of said multiple users to access said particular DEOSs.

2. A method according to claim 1 and further comprising:
generating an individual designator for each individual user of said multiple users, said individual designator comprising:
an organization identifier; and
a data access profile, designating permissions of said individual user to ones of said multiplicity of DEOSs.

3. A method according to claim 2 and wherein said collecting initial permissions comprises at least one of:
receiving permissions to said multiplicity of DEOSs from metadata associated particularly with said multiplicity of DEOSs; and
receiving permissions to said multiplicity of DEOSs from metadata associated particularly with said multiple users.

4. A method according to claim 3 and wherein said metadata associated particularly with said multiple users indicates existing external user groups.

5. A method according to claim 2 and also comprising defining a plurality of DEOS groups, each of said plurality of DEOS groups including a subset of said multiplicity of DEOSs.

6. A method according to claim 5 and wherein said initial user groups are based on at least one of:
said initial permissions to said multiplicity of DEOSs;
said DEOS groups;
said notifications of actual access events; and
existing external user groups.

7. A method according to claim 1 and wherein said initial user groups are based on said notifications of actual access events to ones of said multiplicity of DEOSs in more than one of said ACONEs.

8. A method according to claim 5 and also comprising assigning a risk ranking score to each of said DEOS groups.

9. A method according to claim 8 and wherein said risk ranking score indicates a level of sensitivity of each of said DEOS groups relative to others of said DEOS groups.

10. A method according to claim 8 and wherein said risk ranking score is at least partially based on at least one of:
a level of sensitivity of said DEOS material of said ones of said DEOSs in said DEOS group;
a number of said individual users of said multiple users having permissions to said DEOS group; and
said organization identifiers of said individual users having permissions to the DEOS group.

11. A method according to claim 8 and wherein said modified permissions are further based at least partially on at least one of:
said initial permissions;
said DEOS groups;
said initial user groups; and
said risk ranking score.

12. A method according to claim 1 and further comprising receiving a policy that determines a duration for which permissions are retained by said users after said updated notifications of actual access events to said multiplicity of DEOSS.

13. A method according to claim 12 and wherein said duration is at least partially based on a risk ranking score associated with said DEOSs, said risk ranking score indicating a level of sensitivity of said DEOSs relative to others of said DEOSS.

14. A method according to claim 1 and further comprising deleting said initial user groups and removing permissions associated therewith, after generating said modified user groups.

15. A method according to claim 4 and further comprising updating said existing external user groups based on said modified user groups.

16. A method according to claim 1 and wherein said at least one ACONE comprises at least one of:
a firewall;
an Internet proxy;
a Domain Name System gateway;
an email server;
a database;
a file server; and
a productivity application.

17. A method according to claim 2 and further comprising assigning a modified risk ranking score to each of said DEOS groups.

18. A method according to claim 17 and wherein each of said modified risk ranking scores is at least partially based on at least one of:
a number of said individual users of said multiple users having permissions to said DEOS group;
a level of sensitivity of said DEOS material in said DEOS group; and
said organization identifiers of said individual users having permissions to said DEOS group.

19. A method according to claim 17 and further comprising providing a permissions analytics output notification comprising at least some of said modified risk ranking scores.

20. A system for dynamically refining access rules for governing control of access by multiple users to a multiplicity of data elements or services (DEOSs) stored in or accessed through at least one access controllable network element (ACONE), the system including at least one computer and comprising:

a permissions input unit for collecting initial permissions to ones of said multiplicity of DEOSs, each of said multiplicity of DEOSs including DEOS material;

an access event tracker for receiving notifications of actual access events of ones of said multiple users to ones of said multiplicity of DEOSs and for periodically receiving updated notifications of actual access events;

an initial user group generator for generating initial user groups, each of said initial user groups including one or more of said multiple users;

a modified user group generator for:

generating, for each of said initial user groups, based at least partially on said updated notifications of actual access events, a list of those of said multiple users who have accessed at least one of said multiplicity of DEOSs; and based at least partially on said lists, generating modified user groups, each of said modified user groups including a selected subset of said multiple users;

a modified permissions generator for, based at least partially on said modified user groups, generating modified permissions to at least one of said multiplicity of DEOSs; and a modified permissions output unit for, based on said modified permissions to, updating said initial permissions to ones of said multiplicity of DEOSs, thereby enabling, for particular DEOSs of said multiplicity of DEOSs, only users in a corresponding one of said selected subset of said multiple users to access said particular DEOSs.

* * * * *